United States Patent
Yasumatsu et al.

(10) Patent No.: US 10,285,421 B2
(45) Date of Patent: *May 14, 2019

(54) ANTHOCYANIN-PIGMENT COLOR DEVELOPER

(71) Applicant: KOHJIN LIFE SCIENCES CO., LTD., Tokyo (JP)

(72) Inventors: Yoshie Yasumatsu, Oita (JP); Yuki Saito, Oita (JP); Kenichi Ason, Oita (JP)

(73) Assignee: KOHJIN LIFE SCIENCES CO., LTD., Tokyo (JP)

( * ) Notice: Subject to any disclaimer, the term of this patent is extended or adjusted under 35 U.S.C. 154(b) by 416 days.

This patent is subject to a terminal disclaimer.

(21) Appl. No.: 14/415,375

(22) PCT Filed: Jul. 17, 2013

(86) PCT No.: PCT/JP2013/069391
§ 371 (c)(1),
(2) Date: Jan. 16, 2015

(87) PCT Pub. No.: WO2014/014020
PCT Pub. Date: Jan. 23, 2014

(65) Prior Publication Data
US 2015/0164120 A1    Jun. 18, 2015

(30) Foreign Application Priority Data

Jul. 20, 2012 (JP) .................. 2012-161170

(51) Int. Cl.
| | | |
|---|---|---|
| *A23L 31/15* | (2016.01) | |
| *A23L 5/43* | (2016.01) | |
| *C09B 61/00* | (2006.01) | |

(52) U.S. Cl.
CPC .............. *A23L 5/43* (2016.08); *A23L 31/15* (2016.08); *C09B 61/00* (2013.01); *A23V 2002/00* (2013.01); *A23V 2200/044* (2013.01)

(58) Field of Classification Search
CPC ............ A23L 5/43; A23L 31/15; C09B 61/00
See application file for complete search history.

(56) References Cited

U.S. PATENT DOCUMENTS

| | | | | |
|---|---|---|---|---|
| 3,888,839 A | * | 6/1975 | Newell ................. | C12N 1/005 426/656 |
| 3,914,450 A | * | 10/1975 | Robbins ................ | C12N 1/005 426/533 |
| 3,991,215 A | * | 11/1976 | Robbins .................... | A23J 1/18 426/60 |
| 5,085,875 A | * | 2/1992 | Penttila ................. | A23K 10/16 426/60 |
| 2008/0255226 A1 | * | 10/2008 | Eidenberger ............ | A23L 33/18 514/456 |

FOREIGN PATENT DOCUMENTS

| | | |
|---|---|---|
| JP | 08-224068 | 9/1996 |
| JP | 08-266245 | 10/1996 |
| JP | 11-123065 | 5/1999 |
| JP | 2001-095526 | 4/2001 |
| JP | 2001-329186 | 11/2001 |
| JP | 2003-284528 | 10/2003 |
| JP | 2003-327861 | 11/2003 |
| JP | 2009039019 A * | 2/2009 |
| JP | 2013-053083 | 3/2013 |

OTHER PUBLICATIONS

Sawar, G., Shah, B.G., Mongeau, R., Hoppner, K. 1985. "Nucleic Acid, Fiber and Nutrient Compositions of Inactive Dried Food Yeast Products." J. Food Sci. vol. 50, pp. 353-357.*

Total RNA Isolation From Yeast. Rife, 2001. Downloaded from http://csmbio.csm.jmu.edu/biology/courses/bio480_580/mblab/RNA.htm on Oct. 4, 2018.*

Jazwinski, S.M. 1990. "Preparations of Extracts from Yeast" in Methods in Enzymology Guide to Protein Purification vol. 182, pp. 154-174.*

* cited by examiner

*Primary Examiner* — Nikki H. Dees
(74) *Attorney, Agent, or Firm* — Greenblum & Bernstein, P.L.C.

(57) ABSTRACT

[Problem] To make a color of a processed food containing anthocyanin pigment into a vibrant color. In this respect, using a common foodstuff that is cheap and highly safe, without adding a coloring agent, and not imparting an incongruous flavor to the food is preferred.

[Means for Solving the Problem] To an anthocyanin pigment or a common processed food containing anthocyanin pigment is added, in an appropriate amount, a yeast extract containing 5 wt % or more of a peptide, 5 wt % or more of RNA, 4 wt % or less of free amino acid, and preferably further containing 15 wt % or more of dietary fiber.

10 Claims, No Drawings

ANTHOCYANIN-PIGMENT COLOR DEVELOPER

FIELD OF THE INVENTION

The present invention relates to a method for developing the color of an anthocyanin pigment contained in a food product, and to a color developer.

BACKGROUND OF THE INVENTION

Commercial value of a food product obtained by processing ingredients such as strawberries or blueberries having anthocyanin pigment, which produces a red-to-blue color, is greatly affected by a color derived from those ingredients. However, anthocyanin pigment is an unstable substance and quickly discolors due to processing such as crushing, extraction, or heating, losing the original vibrant color of the raw substance. Therefore, coloring agents are used in order to improve the commercial value of items processed in this way.

Examples of coloring agents include synthetic coloring agents such as red number 2, or natural coloring agents such as carotenoid pigment and cochineal pigment. However, an original, natural color of an ingredient is unlikely to be recaptured even with the addition of a coloring agent, and from a safety perspective as well, a method has been sought for recapturing the vibrant color of anthocyanin pigment without adding a coloring agent.

Conventionally, a method of stabilizing anthocyanin pigment has been investigated. Patent Literature 1 describes a stabilization method in which anthocyanin pigment extracted from a plant is mixed into table salt and made into powdered table salt. Patent Literature 2 describes a method of adding a pigment as well as 1,5-D-anhydrofructose (derived from a starch) to food or medicine. Patent Literature 3 describes a method preventing fading of anthocyanin pigment having nandina leaf extract as an active component. However, each of these methods prevents fading of anthocyanin pigment over time following extraction or refinement, but none are a method for recapturing the vibrant color prior to extraction. Patent Literature 4 describes a meat color improving agent for meat foodstuffs using a yeast extract; however, the yeast extract described in this document has a small color-improvement effect on anthocyanin pigment and also contains a large amount of nucleotides, therefore imparting an umami flavor to food.

RELATED ART

Patent Literature

Patent Literature 1: Japanese Patent Laid-open Publication No. 2001-329186
Patent Literature 2: Japanese Patent Laid-open Publication No. 2003-327861
Patent Literature 3: Japanese Patent Laid-open Publication No. H8-224068
Patent Literature 4: Japanese Patent Laid-open Publication No. 2003-284528

SUMMARY OF THE INVENTION

Problems to be Solved by the Invention

A problem to be resolved is to make a color of a processed food containing anthocyanin pigment into a vibrant color, such as that originally present in the ingredient. In this respect, using a common foodstuff that is cheap and highly safe is preferred, without adding a coloring agent. In addition, an incongruous flavor, particularly an umami flavor, is preferably not imparted to the food.

Means for Solving the Problems

Based on these conditions, the inventors of the present invention have discovered that a yeast extract having a specific composition has an effect of developing the color of anthocyanin pigment, and that an extremely vibrant color such as that originally present in the ingredient can be obtained by adding a small amount of the yeast extract to a processed food containing anthocyanin pigment.

Specifically, the present invention relates to:

(1) An anthocyanin pigment color developer having as an active component a yeast extract containing 5 wt % or more of a peptide, 5 wt % or more of RNA, and 4 wt % or less of free amino acid;

(2) The anthocyanin pigment color developer according to (1), wherein the yeast extract contains 15 wt % or more of dietary fiber;

(3) An anthocyanin pigment color development method in which a yeast extract containing 5 wt % or more of a peptide, 5 wt % or more of RNA, and 4 wt % or less of free amino acid is added to anthocyanin pigment or to a foodstuff containing anthocyanin pigment; and (4) An anthocyanin pigment color development method according to (3), wherein the yeast extract contains 15 wt % or more of dietary fiber.

EFFECT OF THE INVENTION

According to the present invention, the color of anthocyanin pigment can be vibrantly developed, independent of changes in pH, simply by adding a small amount of yeast extract, which is a common foodstuff. The yeast extract is a common foodstuff and has a low allergenic quality, thus enabling a highly safe anthocyanin pigment color developer to be obtained.

MODE FOR CARRYING OUT THE INVENTION

A detailed description of the present invention is given below. In the present invention, color of an anthocyanin pigment can be developed by adding yeast extract having a specific composition to the anthocyanin pigment or a food containing the pigment.

The anthocyanin pigment is a pigmentation compound contained in flowers, vegetables, and fruits (specifically, strawberries, grapes, prunes, blueberries, acerola, red cabbage, eggplant, red shiso, black rice, purple sweet potatoes, and the like), giving them their color. Examples of the anthocyanin pigment extracted from such plant bodies and refined for use include grape skin pigment, purple sweet potato pigment, purple corn pigment, shiso pigment, red radish pigment, hibiscus pigment, cherry pigment, blueberry pigment, and the like.

Examples of foods containing the anthocyanin pigment according to the present invention may include processed food having as an ingredient plant bodies containing anthocyanin pigment (e.g., strawberries, grapes, prunes, blueberries, acerola, cherries, eggplant, red shiso, purple sweet potatoes, and the like). The processed form of the food may be any form, including a paste, jam, juice, jelly, or cream.

Alternatively, the refined anthocyanin pigment extracted from the plant bodies noted above may also be an additive in the food.

A yeast extract used in the present invention contains 5 wt % or more of a peptide, preferably 10 wt % or more of the peptide, and more preferably 16 wt % or more of the peptide; contains 5 wt % or more of RNA, preferably 10 wt % or more of RNA, and more preferably 25 wt % or more of RNA; and contains 4 wt % or less of free amino acids, and more preferably 2 wt % or less of the free amino acids. In addition, the yeast extract preferably contains 15 wt % or more of dietary fiber.

Moreover, the yeast extract preferably contains less than 4 wt % of 5'-inosinic acid, less than 4 wt % of 5'-guanylic acid, and less than 4 wt % of free amino acid. Less than 1 wt % of each of these components is still more preferred. 5'-inosinic acid, 5'-guanylic acid, and free amino acid are all umami components, and therefore when a yeast extract containing a large quantity of these components is added to food, umami is imparted to the food, which is not preferred in a case where only color development of a pigment is desired.

The yeast extract used in the present invention can be produced by cultivating yeast preferably containing 6.5% or more of RNA and, after harvesting and cleaning such yeast cell bodies, condensing, pasteurizing, and drying an extract obtained by deactivating enzymes within the yeast cell bodies using hot water and, thereafter, adding a cell wall lytic enzyme. When a nucleolytic enzyme or a protease act on the extract, RNA content and peptide content are unlikely to reach a specified amount, and therefore this is not preferred.

The yeast extract obtained in this way, without nucleolytic enzyme or protease action, has almost no taste.

Examples of the yeast used in producing the yeast extract of this kind include baker's yeast, brewer's yeast (*Saccharomyces cerevisiae*), and Torula yeast (*Candida utilis*). Use of Torula yeast is preferred, the Torula yeast generally containing the highest amount of RNA among these yeasts.

An amount of yeast extract added as a color developer to the anthocyanin pigment or to the food that includes the anthocyanin pigment is commonly 0.01 to 5 wt %, is preferably 0.03 to 1 wt %, and is more preferably 0.05 to 0.3 wt %. Within this range, the color of the anthocyanin pigment can develop without imparting a foreign taste. When the anthocyanin pigment or the food contain more than 5 wt %, the inherent flavor of the yeast extract becomes noticeable and is also not preferred in terms of cost.

EMBODIMENTS

The present invention is described in detail in embodiments below. The present invention, however, is not limited to the following embodiments.

Various measurement methods and testing methods in the embodiments are as follows:

<Method for Measuring Free Amino Acid Content> A yeast extract sample dissolved in 0.02 N-HCl was used as a measurement sample. The sample was measured using an amino acid analyzer (Hitachi high-speed amino acid analyzer L-8900).

<Method for Measuring Total Amino Acid Content>

A yeast extract sample was dissolved in 6N-HCl, then was left to stand at 110° C. for 24 hours to hydrolyze. A portion of the sample was diluted in 0.02N-HCl and used as a total amino acid measurement sample. The sample was measured using an amino acid analyzer (Hitachi high-speed amino acid analyzer L-8900).

<Method for Measuring Peptide Content>

A peptide content is calculated by subtracting the free amino acid content from the total amino acid content.

<Method for Measuring RNA Content>

A yeast extract sample dissolved in superpure water was used as a measurement sample, then a measurement was conducted using an HPLC method. An Asahipak HPLC column GS-320H was used as a column, and 0.1 M of a sodium phosphate buffer was used as an eluent. A detection wavelength was set to 260 nm.

<Method for Measuring Dietary Fiber Content>

Measurement was conducted at the Japan Food Research Laboratories using an enzymatic-gravimetric method.

<Method for Sensory Analysis>

A sensory analysis of food taste was conducted with five panelists for an embodiment sample and a comparative example sample, which were evaluated in comparison to the taste of a control sample.

<Production Example 1> Method of Obtaining Yeast Extract

Using a 10N sulfuric acid, 1000 ml of a 10% cell body suspension of Candida utilis Cs 7529 strain (FERM BP-1656) was adjusted to a pH of 3.5, then was subjected to a heat treatment at 60° C. for 30 minutes, after which the cell bodies were collected via centrifugal separation and cleaned with water to remove the sulfuric acid and superfluous components. After the cell bodies were adjusted to a cell body concentration of 10% and suspended using water, a heat treatment was performed at 90° C. for 30 minutes; enzymes within the cell bodies were completely deactivated; the suspension was adjusted to 40° C. and a pH of 7.0; 0.5 g of a cell wall lytic enzyme ("Tunicase," manufactured by Daiwa Kasei) was added thereto to react for four hours; and the extract was extracted. Cell body residue was removed by centrifugal separation, then a supernatant fluid thus obtained was condensed and spray-dried to obtain 30 g of yeast extract powder. The obtained yeast extract (hereafter referred to as "yeast extract 1") contained 30.4 wt % of RNA, 0.0 wt % of 5'-inosinic acid, 0.0 wt % of 5'-guanylic acid, 0.5 wt % of free amino acid, 18.7 wt % of peptide, and 22.7 wt % of dietary fiber.

<Embodiment 1> Effect of Adding to Strawberry Paste

A control strawberry paste was produced by adding strawberries to a blender. Yeast extract 1 (peptide content 18.7 wt %; RNA content 30.4 wt %; free amino acid content 0.5 wt %; dietary fiber content 22.7 wt %) was added at 0.2 g and mixed together with 100 g of the control strawberry paste. This was then used as a sample for embodiment 1.

Comparative Example 1

Yeast extract 2 (peptide content 22.09 wt %; RNA content 0.00 wt %; free amino acid content 1.26 wt %; dietary fiber content 33.3 wt %) was added at 0.2 g and mixed together in embodiment 1 instead of the yeast extract 1. This was then used as a sample for comparative example 1.

The color of the strawberry pastes according to embodiment 1 and comparative example 1 were evaluated using a spectrophotometer (manufactured by Konica Minolta Sensing). In addition, the pH of each paste was measured using a pH meter and quality of taste was evaluated by sensory analysis. Measurement results of the spectrophotometer are shown in Table 1. L* represents brightness, while a* represents chromaticity in a red direction, and b* represents chromaticity in a yellow direction. Embodiment 1 had a high a* value as compared to the control strawberry paste and a more vibrant color of red than the control, whereas comparative example 1 exhibited no marked difference with the control. Also, no difference was detected in the taste of embodiment 1 as compared to the control; however, umami was imparted to comparative example 1, which was sensed as a foreign taste.

TABLE 1

| Test range | pH | L* (D65) | a* (D65) | b* (D65) |
|---|---|---|---|---|
| Control | 3.77 | 46.09 | 29.42 | 15.75 |
| Embodiment 1 | 3.79 | 43.23 | 34.15 | 10.78 |
| Comp. Example 1 | 3.78 | 45.38 | 28.32 | 14.51 |

<Embodiment 2> Effect of Adding to Blueberry Solution

Five parts water was added to frozen blueberries and processed in a blender, then was subjected to centrifugation for 10 minutes at 10,000 RPM, and a supernatant was used as a control blueberry solution. The yeast extract 1 (peptide content 18.7 wt %; RNA content 30.4 wt %; free amino acid content 0.5 wt %; dietary fiber content 22.7 wt %) was added at 0.2 g to 100 g of the control blueberry solution. This was then used as a sample for embodiment 2.

Comparative Example 2

The yeast extract 2 (peptide content 22.09 wt %; RNA content 0.00 wt %; free amino acid content 1.26 wt %; dietary fiber content 33.3 wt %) was added at 0.2 g in embodiment 2 instead of the yeast extract 1. This was then used as a sample for comparative example 2.

The blueberry solutions of embodiment 2 and comparative example 2 were visually evaluated for color. The quality of taste of the blueberry solutions was also evaluated using sensory analysis. Embodiment 2 had a more vibrant purple color as compared to the control blueberry solution, whereas the color of comparative example 2 exhibited no marked difference with the control. Also, the quality of taste of embodiment 2 was almost identical to the control; however, umami was imparted to comparative example 2, which was sensed as a foreign taste.

<Embodiment 3> Effect of Adding to Acerola Beverage

A commercially available acerola beverage was used as the control. The ingredients of the control were sugars (high fructose corn syrup, maltooligosaccharide), acerola juice, honey, acidifier, fragrance, anthocyanin pigment, sweetener (stevia), and a carotenoid pigment. The yeast extract 1 (peptide content 18.7 wt %; RNA content 30.4 wt %; free amino acid content 0.5 wt %; dietary fiber content 22.7 wt %) was added at 0.2 g to 100 g of the control acerola beverage. This was then used as a sample for embodiment 3.

Comparative Example 3

The yeast extract 2 (peptide content 22.09 wt %; RNA content 0.00 wt %; free amino acid content 1.26 wt %; dietary fiber content 33.3 wt %) was added at 0.2 g in embodiment 3 instead of the yeast extract 1. This was then used as a sample for comparative example 3.

The acerola beverages of embodiment 3 and comparative example 3 were visually evaluated for color. The quality of taste of the acerola beverages was also evaluated using sensory analysis. Embodiment 3 had a more vibrant purple color as compared to the control acerola beverage, whereas the color of comparative example 3 exhibited no marked difference with the control. In addition, the quality of taste of embodiment 3 was identical to the control and no foreign taste was detected; however, umami was imparted to comparative example 3, which was not preferred.

<Embodiment 4> Effect of Adding to Grape Juice

Commercially available grape juice was used as the control. The ingredients of the control were grapes and fragrance. The yeast extract 1 (peptide content 18.7 wt %; RNA content 30.4 wt %; free amino acid content 0.5 wt %; dietary fiber 22.7 wt %) was added at 0.2 g to 100 g of the control grape juice. This was then used as a sample for embodiment 4.

Comparative Example 4

The yeast extract 2 (peptide content 22.09 wt %; RNA content 0.00 wt %; free amino acid content 1.26 wt %; dietary fiber content 33.3 wt %) was added at 0.2 g in embodiment 4 instead of the yeast extract 1. This was then used as a sample for comparative example 4.

The grape juices of embodiment 4 and comparative example 4 were visually evaluated for color. The quality of taste of the grape juices was also evaluated using sensory analysis. Embodiment 4 had a more vibrant purple color as compared to the control grape juice, whereas the color of comparative example 4 exhibited no marked difference with the control. In addition, the quality of taste of embodiment 4 was identical to the control and no foreign taste was detected; however, umami was imparted to comparative example 4, which was sensed as a foreign taste.

INDUSTRIAL APPLICABILITY

As described above, color of typical processed food and drink containing anthocyanin pigment can be vibrantly developed according to the present invention. Accordingly, visual appeal can be improved for fruit and vegetable jam, ice cream, juice, and jelly, for example.

The invention claimed is:

1. An anthocyanin pigment color development method wherein a yeast extract is added to anthocyanin pigment or to a foodstuff containing anthocyanin pigment,
   wherein the yeast extract comprises 5 wt % or more of a peptide, 25 wt % or more of RNA, and 4 wt % or less of free amino acid, as extracted from yeast cells, and
   wherein the yeast extract is added in an effective amount to develop the color of the anthocyanin pigment.

2. An anthocyanin pigment color development method according to claim 1, wherein the yeast extract further comprises: 15 wt % or more of dietary fiber, as extracted from yeast cells.

3. An anthocyanin pigment color development method according to claim 1 wherein an effective amount of the yeast extract is added to a foodstuff containing anthocyanin to develop the color the foodstuff containing anthocyanin.

4. An anthocyanin pigment color development method according to claim 1 wherein the yeast extract when added to the anthocyanin pigment or to the foodstuff containing anthocyanin does not impart an umami taste.

5. A color developed anthocyanin pigment comprising:
   an anthocyanin pigment and
   a yeast extract, the yeast extract comprising 5 wt % or more of a peptide, 25 wt % or more of RNA, and 4 wt % or less of free amino acid in an amount effective to develop the color of the anthocyanin pigment.

6. The color developed anthocyanin pigment according to claim 5, wherein the yeast extract further comprises 15 wt % or more of dietary fiber, as extracted from yeast cells.

7. A foodstuff comprising the color developed anthocyanin pigment according to claim 5.

8. The foodstuff comprising the color developed anthocyanin pigment according to claim 7, wherein the yeast extract does not impart an umami taste to the foodstuff.

9. The color developed anthocyanin pigment according to claim 5 wherein the color development of the anthocyanin pigment is an increase in the chromaticity in a red direction.

10. The anthocyanin pigment color development method according to claim 1 wherein the color development of the anthocyanin pigment is an increase in the chromaticity in a red direction.

* * * * *

UNITED STATES PATENT AND TRADEMARK OFFICE
CERTIFICATE OF CORRECTION

PATENT NO. : 10,285,421 B2
APPLICATION NO. : 14/415375
DATED : May 14, 2019
INVENTOR(S) : Yasumatsu et al.

Page 1 of 1

It is certified that error appears in the above-identified patent and that said Letters Patent is hereby corrected as shown below:

In the Claims

Column 6, Line 57, Claim 3, please insert --of-- between "color" and "the"

Signed and Sealed this
Thirty-first Day of March, 2020

Andrei Iancu
*Director of the United States Patent and Trademark Office*